United States Patent [19]
Kato et al.

[11] Patent Number: 4,712,883
[45] Date of Patent: Dec. 15, 1987

[54] REAR FOCUS ZOOM LENS

[75] Inventors: Masatake Kato, Tokyo; Sadahiko Tsuji; Toshiaki Asano, both of Kanagawa, all of Japan

[73] Assignee: Canon Kabushiki Kaisha, Tokyo, Japan

[21] Appl. No.: 571,481

[22] Filed: Jan. 17, 1984

[30] Foreign Application Priority Data

Jan. 18, 1983 [JP] Japan .................................. 58-6058

[51] Int. Cl.⁴ ...................... G02B 15/14; G02B 13/18
[52] U.S. Cl. .................................... 350/427; 350/432
[58] Field of Search ........................ 350/423, 427, 432

[56] References Cited
U.S. PATENT DOCUMENTS
3,975,089  8/1976  Betensky .............................. 350/427

Primary Examiner—John K. Corbin
Assistant Examiner—Rebecca D. Gass
Attorney, Agent, or Firm—Toren, McGeady & Associates

[57] ABSTRACT

The disclosed zoom lens includes, from front to rear, a magnification-power variable lens assembly which serves for zooming and an image forming lens assembly which is stationary during zooming. The image forming assembly has a lens component B of negative refractive power which is preceded by at least one lens component A movable for focusing and which is followed by at least one lens component C movable for focusing. This structure makes achievement of a compact form and good stability in aberration correction possible throughout the entire focusing range.

20 Claims, 14 Drawing Figures

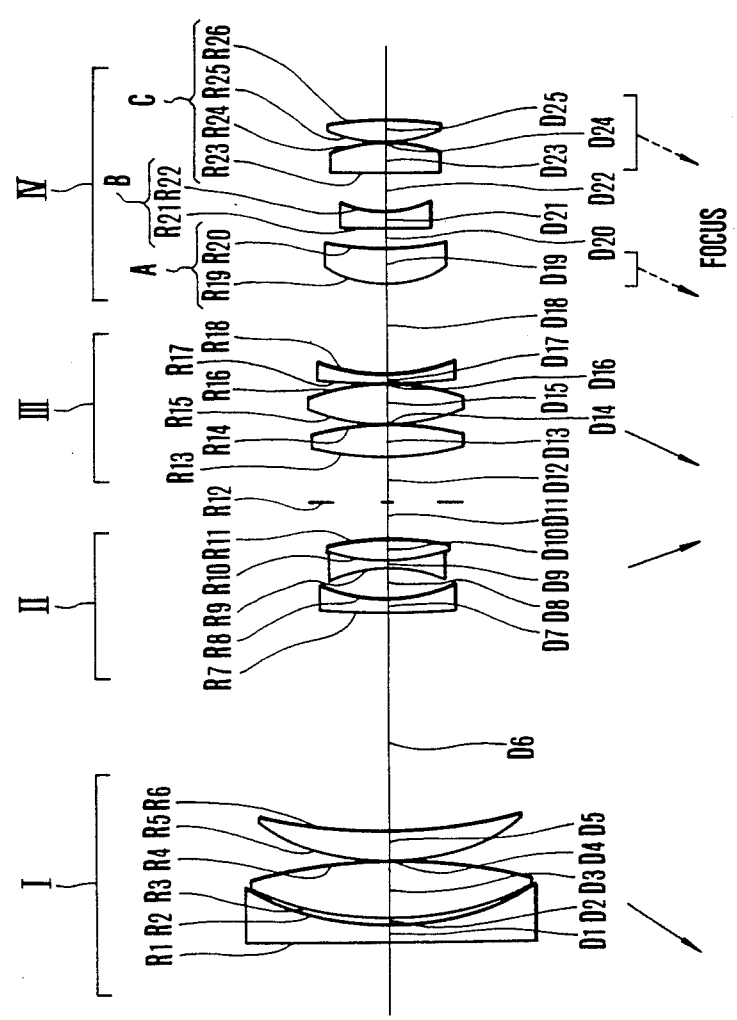

REAR FOCUS ZOOM LENS

BACKGROUND OF THE INVENTION

1. Field of the Invention

This invention relates to zoom lenses of the rear focus type.

2. Description of the Prior Art

The method called "rear focusing" or "inner focusing" has been found useful for quick and easy focusing in many intermediate to super telephoto lenses. This focusing method avoids the problem of telephoto lenses having relatively long physical lengths and heavy front lens components. There, focusing by moving the entire system as a whole or by moving the front component results in difficult rotation of a helicoid or in a change of the balance of the entire lens system as the focusing component moves forward.

The rear focusing method was invented in order to overcome such drawbacks and performs its focusing through lens elements which are relatively near the film plane and are of small diameter.

In this rear focusing method, an appropriate power distribution in the focusing component makes it possible to avoid deterioration of the optical or imaging performance and also to reduce the amount of movement of the focusing component to the closest object.

This has many advantages, particularly during automatic focusing. The focusing component is easy to drive by virtue of its light weight and compact form. The signal transmission from the camera body assumes a simple form because the focusing component lies relatively near the camera body. The feedback for detection of the in-focus condition is easy to apply because the total focusing movement can be minimized.

These advantages are also found in zoom lenses. With a prior zoom lens, particularly one which is focused by driving the front component, raising the zoom ratio or increasing the relative aperture requires increasing the entire lens system in both the longitudinal and lateral directions. The rear focusing method is very effective for satisfying the requirement of size and convenience. However, the employment of the rear focusing method in a zoom lens generally requires providing the lens system with an air separation through which the focusing component operates over the required range. This tends to elongate the total length of the zoom lens.

Japanese Laid-Open Patent Application No. SHO 57-78514 deals with a compact and well-corrected zoom lens. It discloses a lens system that includes, from front to rear, a stationary front group, magnification power-variable lens groups movable for zooming, and a rear group which as a whole does not change its position and which has a diaphragm in the interior thereof. The rear group has a negative-power lens member which is movable for focusing and located on the image side of the diaphragm. The movable lens member is moved rearward to focus down on shorter object distances. However, even this zoom lens cannot be said to be sufficient from the standpoint of compactness and aberration correction.

SUMMARY OF THE INVENTION

An object of the invention is to provide a compact zoom lens of shortened total length over the entire system.

Another object of the invention is to provide a zoom lens well corrected for aberrations.

The zoom lens according to the present invention comprises, from front to rear, a magnification power variable lens assembly movable for zooming and an image forming assembly which remains stationary during zooming. The image forming assembly includes a negative component B, at least one lens component A on the object side of the lens component B and at least one lens component C on the image side of the lens component B. When focusing, the lens component A and lens component C are made to move to effect focusing. This makes it possible to achieve the above-described objects.

In the zoom lens according to the present invention, the lens component B is either held stationary during focusing or may be moved during focusing. But it should be pointed out that making it movable is rather advantageous in achieving the above-described objects.

In particular, when the lens component A is constructed in the form of a component of positive refractive power and the lens component C in the form of a lens component of positive refractive power, the total number of constituent lens elements of the components for focusing can be minimized, the total axial movement of the focusing components for the required range can be minimized, and good aberration correction can be maintained stable against variation of the object distance.

BRIEF DESCRIPTION OF THE DRAWINGS

FIG. 1 and FIG. 2 are longitudinal section views of two specific embodiments of the zoom lens according to the present invention respectively.

DETAILED DESCRIPTION OF THE PREFERRED EMBODIMENTS

Figure 1:
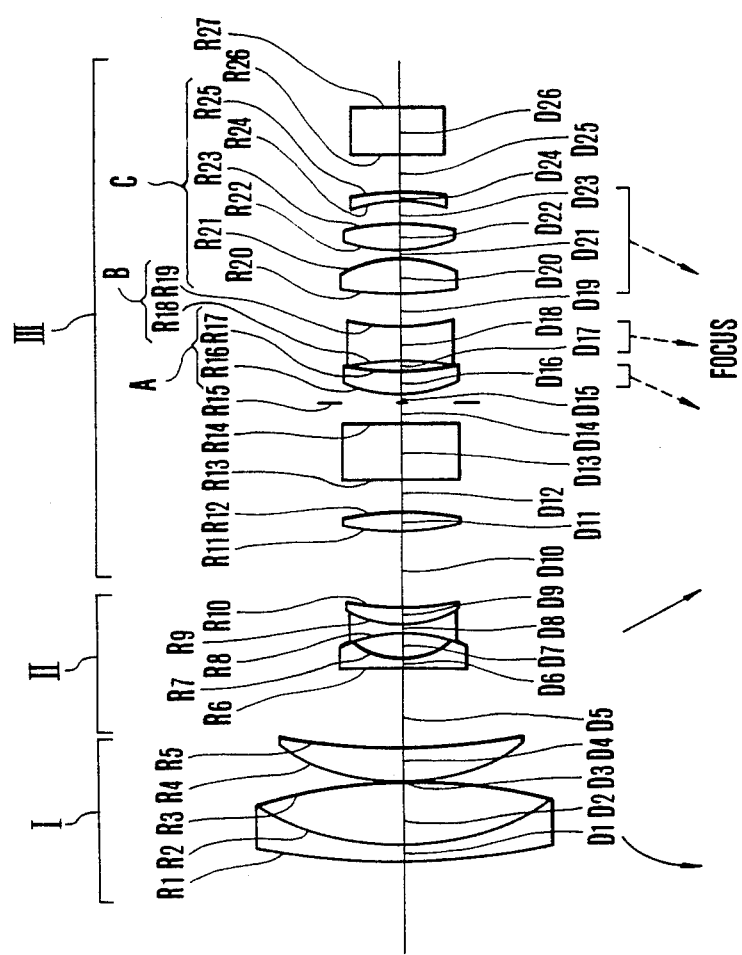
Figure 3A:
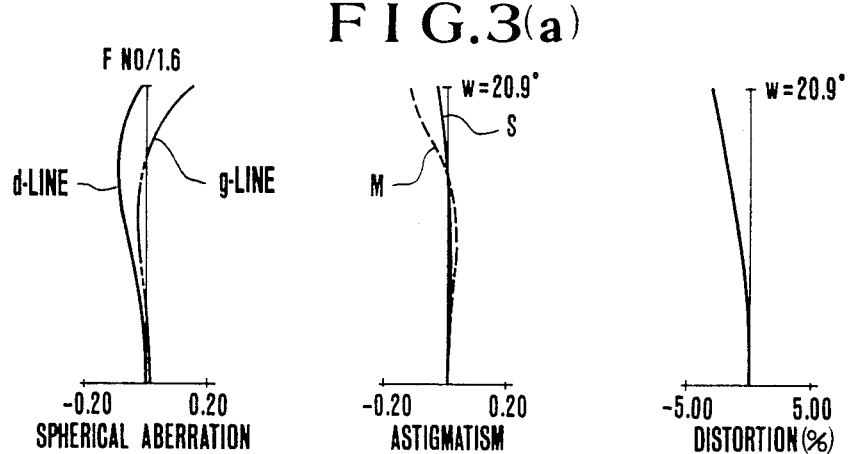
FIGS. 3(a) to 3(c) and FIGS. 4(a) to 4(c) are graphic representations of the aberrations of the zoom lens of FIG. 1.
Figure 3B:
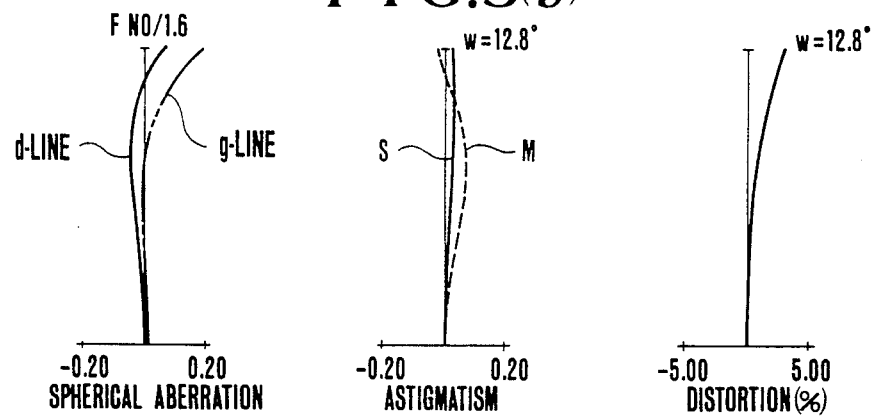
Figure 3C:
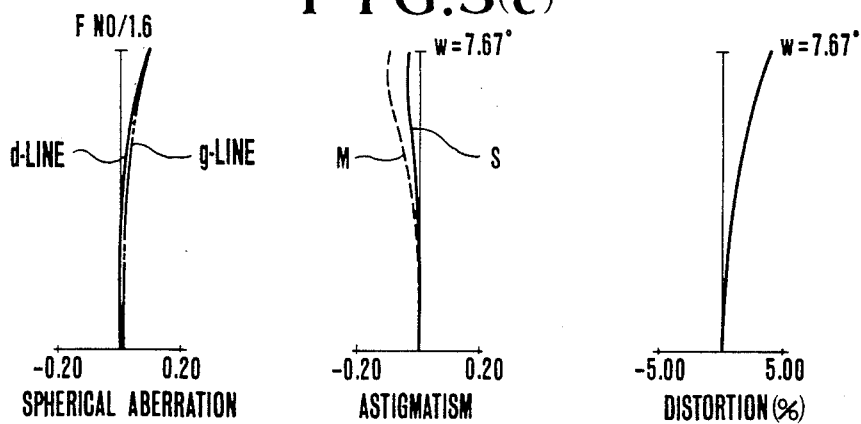
Figure 4A:
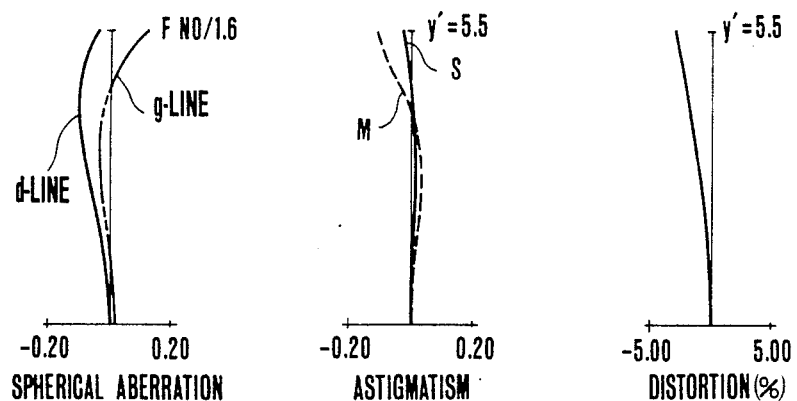
Figure 4B:
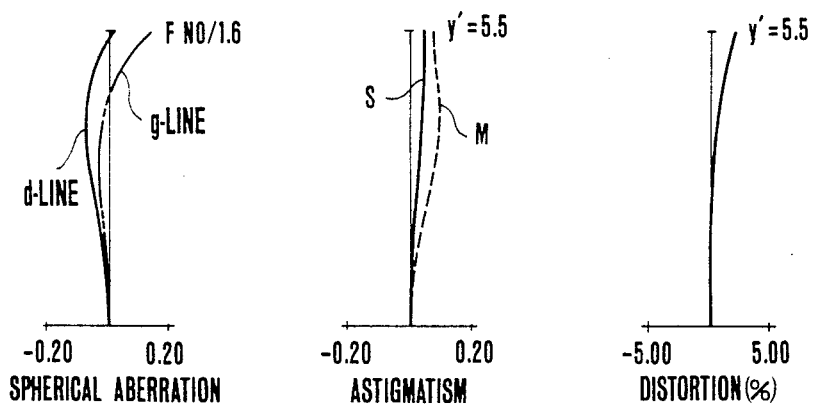
Figure 4C:
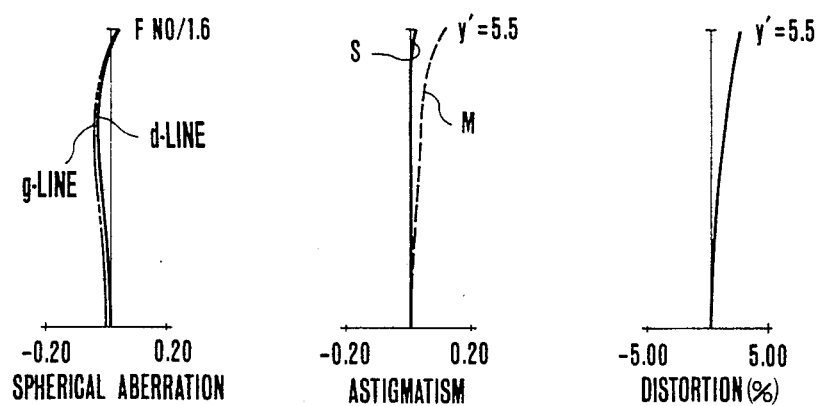
Figure 5A:
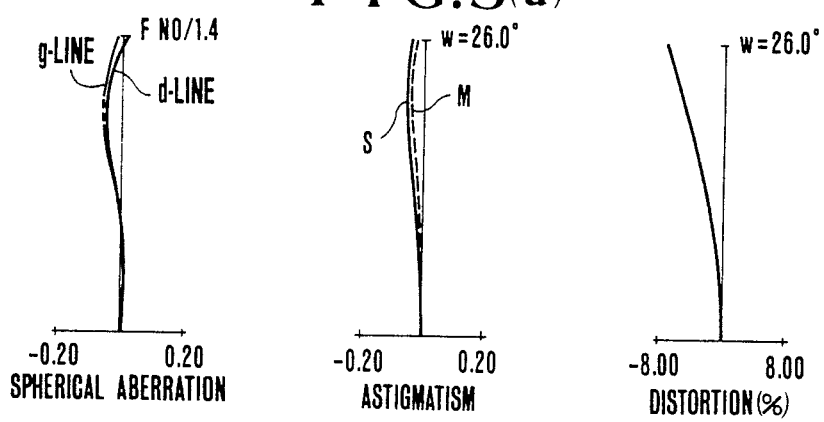
FIGS. 5(a) to 5(c) and FIGS. 6(a) to 6(c) are graphic representations of the aberrations of the zoom lens of FIG. 2.
Figure 5B:
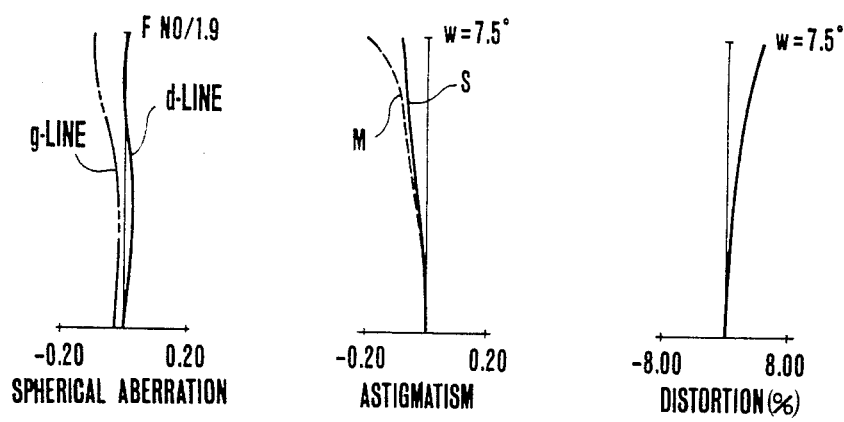
Figure 5C:
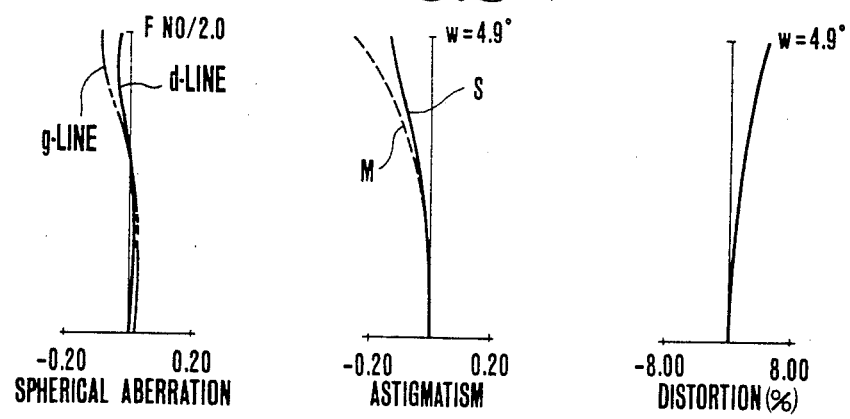
Figure 6A:
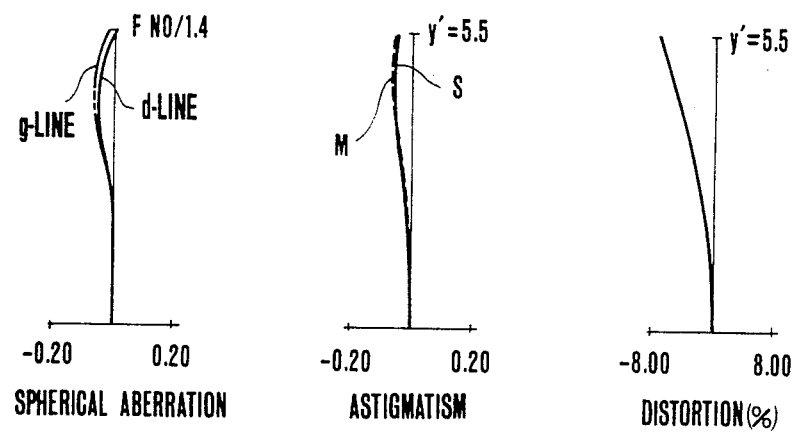
Figure 6B:
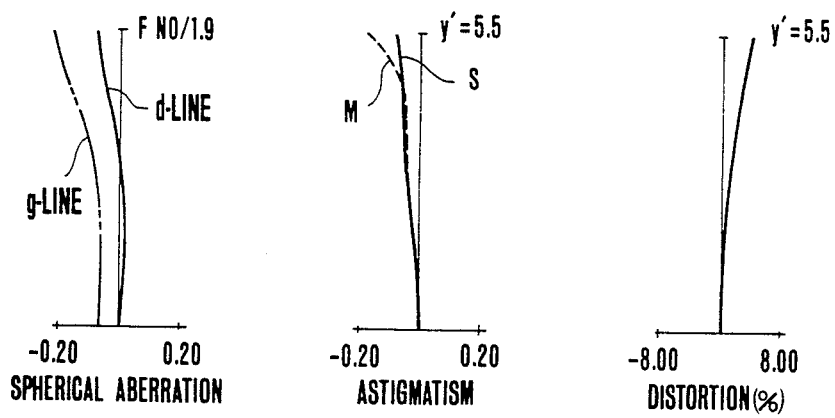
Figure 6C:
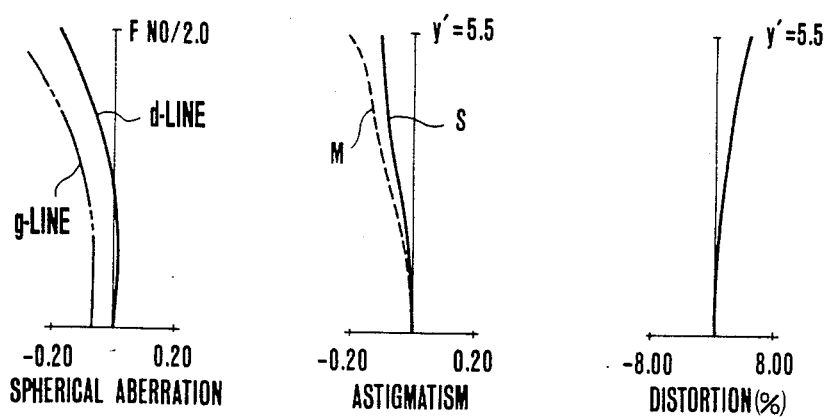

FIGS. 1 and 2 show specific embodiments 1 and 2 of the invention.

The zoom lens of FIG. 1 includes from front to rear a first lens group I of positive refractive power whose main purpose is for compensating for image shift to maintain the position of the image plane constant during zooming. A second lens group II of negative refractive power is movable for varying the power of magnification. A third lens group III is held stationary during zooming and includes a plurality of lens subgroups.

In FIG. 1, lenses with surfaces R11 to R27 constitute an image forming lens group that remains stationary during zooming of these lenses, the lenses with surfaces R16 to R25 form lens members or components for focusing. The lens with surfaces R16 and R17 defines a lens member or component A, the lens with surfaces R18 and R19 forms a lens member or component B of negative power, and the lenses with surfaces R20 to R25 define a lens member or component C. The components A, B, and C are all movable for focusing while the axial air separations D15, D17, D19 and D25 are varied during focusing.

In the embodiment 1 shown in FIG. 1, by moving the pair of lens members A and C as a unit and the lens member B at different speeds, for example, in a ratio of 2:1 in the forward direction while focusing down, variations of the aberrations with focusing can be limited to a minimum, and a reduced total movement can suffice for the equivalent range.

Though this embodiment 1 has forward movement of all the focusing members A, B and C, it is not always necessary for the lens members A, B and C to move in the same direction.

Usually, the direction of movement of the focusing lens component differs, depending upon whether the focusing lens component contributes to an enlarging or reducing system.

For example, when the focusing component is only of the enlarging system, it moves rearward, and when only of the reducing system, it moves forward, as focusing is effected down to shorter object distances.

In the embodiment 1, instead of moving all the lens members A, B and C toward the front to effect focusing, it is also possible to move the lens members A and C forward, while simultaneously moving the member B rearward, as focusing is effected down. This offers the advantage that the total axial movement becomes shorter than when all the members A, B and C move forward.

Another general aspect of the zoom lens is that with an object at a minimum distance, the zoom groups produce more strongly over-corrected spherical aberration than with an infinitely distant object. On the other hand, according to the present invention, the relative position of the lens member B of negative power to the other members A and C of positive power in the image forming lens group changes toward the image plane. Hence, under-corrected spherical aberration is produced to cancel the over-corrected spherical aberration produced from the zoom groups. This results in good stability of spherical aberration during focusing.

Since the ratio of the total movement of the lens members A and C to that of the lens member B may be taken at a desired value, the degree of freedom for solving the problem of correction of off-axis aberrations is increased. This makes it possible to achieve good correction of aberrations.

In embodiment 1, the total movement of the lens members A and C for an object distance of 1.2 meters is 1.0 mm in the telephoto position.

In embodiment 1, the lens member A is not always of positive refractive power, but may be of negative refractive power. The use of a lens member of negative refractive power as the member A assists in increasing the back focus.

FIG. 2 shows another specific embodiment of the zoom lens according to the invention. It includes from front to rear, a first lens group I of positive refractive power, a second lens group II of negative refractive power, a third lens group III of positive refractive power, with these first three groups being movable for zooming, and an image forming lens group IV which is held stationary during zooming.

In FIG. 2, lens surfaces R19 and R20 form part of a lens member A, lens surfaces R21 and R22 define a lens member of negative power, and lens surfaces R23 to R26 form part of a lens member C.

In embodiment 2, the lens member B is held stationary during focusing, and the lens members A and C are made to move in the same direction at the same speed (to the front) with variation of the axial air separations D18, D20, D22 and the separation between the member C and the image plane (not shown).

In embodiment 2, the total movement of the lens members A and C for focusing to an object distance of 1.2 meters is 1.36 mm in the telephoto position.

In embodiment 2, the lens member A and C may be otherwise moved in different relation to each other.

For note, the zoom lenses of the embodiments of the invention employ such a zoom type that the first lens group I counting from front is moved forward as zooming from the wide angle to the telephoto position takes an advantage of realizing the zoom ratio effectively.

If such zoom type is combined with the focusing provision in the first lens group, the diameter of the first lens group is caused to increase. The use of the focusing method of the invention, however, provides a compact zoom lens with the first lens group of reduced diameter while still preserving the increased range of variation of the focal length.

Numerical examples of the specific embodiments 1 and 2 of the invention are next given in the following tables in which Ri denotes the radius of curvature of the i-th lens surface counting from front, Di is the i-th lens thickness of air separation counting from front, and Ni and $\nu i$ are the refractive index and Abbe number of the glass from which the i-th lens element counting from front is made up respectively.

R15 in the numerical example 1 and R12 in the numerical example 2 are stops.

Also in the numerical example 2, the lens surfaces R1, R13 and R14 are made aspherical to further improve the aberration correction. These aspherical surfaces are configured according to an equation expressed as follows:

$$X = \frac{(1/R) H^2}{1 + \sqrt{1 - (H/R)^2}} + AH^2 + BH^4 + CH^6 + DM^8 + EH^{10}$$

where X is the difference between the aspheric surface and a spherical surface which contributes to determination of the focal length in the axial direction for x-axis with y-axis perpendicular to the optical axis and a point of origin at the intersection of the lens surface and x-axis taking the direction in which light advances as positive, R is the radius of curvature in the paraxial region, H is the height from the optical axis, and A, B, C, D and E are aspherical coefficients, and taking the following values:

| | | |
|---|---|---|
| For R1, A = 0, | B = 0.229 × 10$^{-6}$ | C = −0.495 × 10$^{-9}$ |
| | D = 0.343 × 10$^{-11}$ | E = −0.485 × 10$^{-14}$ |
| For R13, A = 0, | B = 0.261 × 10$^{-4}$ | C = 0.203 × 10$^{-7}$ |
| | D = 0.906 × 10$^{-10}$ | E = −0.277 × 10$^{-11}$ |
| For R14, A = 0, | B = −0.751 × 10$^{-5}$ | C = 0.405 × 10$^{-7}$ |
| | D = −0.811 × 10$^{-9}$ | E = −0.370 × 10$^{-12}$ |

Numerical Example 1
F = 14.36~40.82  FNO = 1:1.6  $2\omega$ = 15.3°~41.9°

| | | | | | | | |
|---|---|---|---|---|---|---|---|
| R1 = | 109.050 | D1 = | 2.00 | N1 = | 1.80518 | $\nu$1 = | 25.4 |
| R2 = | 36.607 | D2 = | 7.95 | N2 = | 1.58913 | $\nu$2 = | 61.0 |
| R3 = | −96.757 | D3 = | 0.12 | | | | |
| R4 = | 27.396 | D4 = | 4.95 | N3 = | 1.58913 | $\nu$3 = | 61.0 |
| R5 = | 116.339 | D5 = | Variable | | | | |
| R6 = | 5301.223 | D6 = | 0.95 | N4 = | 1.62299 | $\nu$4 = | 58.2 |
| R7 = | 11.157 | D7 = | 3.71 | | | | |
| R8 = | −18.029 | D8 = | 0.95 | N5 = | 1.51633 | $\nu$5 = | 64.1 |
| R9 = | 15.033 | D9 = | 2.55 | N6 = | 1.80518 | $\nu$6 = | 25.4 |
| R10 = | 82.686 | D10 = | Vari- | | | | |

-continued

Numerical Example 1
F = 14.36~40.82  FNO = 1:1.6  2ω = 15.3°~41.9°

| | | | | | | |
|---|---|---|---|---|---|---|
| R11 = | 33.586 | D11 = | 2.30 | N7 = | 1.58913 | ν7 = 61.0 |
| R12 = | −75.922 | D12 = | 4.43 | | | |
| R13 = | ∞ | D13 = | 7.50 | N8 = | 1.51633 | ν8 = 64.1 |
| R14 = | ∞ | D14 = | 2.50 | | | |
| R15 = | Stop | D15 = | 1.00 | | | |
| R16 = | 17.676 | D16 = | 3.57 | N9 = | 1.77250 | ν9 = 49.6 |
| R17 = | 148.995 | D17 = | 1.25 | | | |
| R18 = | −24.104 | D18 = | 4.05 | N10 = | 1.84666 | ν10 = 23.9 |
| R19 = | 31.936 | D19 = | 4.54 | | | |
| R20 = | 94.976 | D20 = | 4.33 | N11 = | 1.53172 | ν11 = 48.9 |
| R21 = | −19.343 | D21 = | 1.06 | | | |
| R22 = | 23.092 | D22 = | 3.58 | N12 = | 1.77250 | ν12 = 49.6 |
| R23 = | −43.434 | D23 = | 2.92 | | | |
| R24 = | −20.912 | D24 = | 0.92 | N13 = | 1.80518 | ν13 = 25.4 |
| R25 = | −91.507 | D25 = | 5.00 | | | |
| R26 = | ∞ | D26 = | 6.00 | N14 = | 1.51633 | ν14 = 64.1 |
| R27 = | ∞ | | | | | |

| f | 14.36 | 24.21 | 40.82 |
|---|---|---|---|
| D5 | 1.54 | 10.21 | 15.34 |
| D10 | 14.78 | 9.64 | 0.98 |

Numerical Example 2
F = 11.30~64.41  FNO = 1:1.4~2.0  2ω = 9.8°~51.9°

| | | | | | | |
|---|---|---|---|---|---|---|
| *R1 = | 1315.397 | D1 = | 2.50 | N1 = | 1.58350 | ν1 = 29.8 |
| R2 = | 38.730 | D2 = | 0.53 | | | |
| R3 = | 41.132 | D3 = | 7.55 | N2 = | 1.49030 | ν2 = 57.9 |
| R4 = | −75.526 | D4 = | 0.15 | | | |
| R5 = | 32.780 | D5 = | 3.78 | N3 = | 1.60311 | ν3 = 60.7 |
| R6 = | 81.782 | D6 = | Variable | | | |
| R7 = | 196.595 | D7 = | 1.20 | N4 = | 1.77250 | ν4 = 49.6 |
| R8 = | 17.060 | D8 = | 4.88 | | | |
| R9 = | −18.030 | D9 = | 1.00 | N5 = | 1.69680 | ν5 = 55.5 |
| R10 = | 38.724 | D10 = | 2.28 | N6 = | 1.84666 | ν6 = 23.9 |
| R11 = | −65.655 | D11 = | Variable | | | |
| R12 = | Stop | D12 = | Variable | | | |
| *R13 = | 52.234 | D13 = | 3.63 | N7 = | 1.49030 | ν7 = 57.9 |
| *R14 = | −47.733 | D14 = | 0.15 | | | |
| R15 = | 27.741 | D15 = | 5.36 | N8 = | 1.60311 | ν8 = 60.7 |
| R16 = | −32.583 | D16 = | 0.15 | | | |
| R17 = | 462.462 | D17 = | 1.00 | N9 = | 1.58350 | ν9 = 29.8 |
| R18 = | 24.819 | D18 = | Variable | | | |
| R19 = | 14.309 | D19 = | 5.07 | N10 = | 1.62299 | ν10 = 58.2 |
| R20 = | 37.460 | D20 = | 2.43 | | | |
| R21 = | 1783.876 | D21 = | 2.00 | N11 = | 1.84666 | ν11 = 23.9 |
| R22 = | 12.141 | D22 = | 5.09 | | | |
| R23 = | −1426.705 | D23 = | 3.86 | N12 = | 1.69680 | ν12 = 55.5 |
| R24 = | −35.149 | D24 = | 0.20 | | | |
| R25 = | 21.612 | D25 = | 2.48 | N13 = | 1.77250 | ν13 = 49.6 |
| R26 = | −149.796 | | | | | |

| f | 11.30 | 41.56 | 64.41 |
|---|---|---|---|
| D6 | 2.93 | 28.23 | 32.62 |
| D11 | 13.63 | 4.90 | 1.10 |
| D12 | 15.94 | 6.37 | 2.33 |
| D18 | 2.0 | 11.53 | 15.61 |

What we claim:

1. A zoom lens of the rear focusing type comprising: from front to rear, a magnification varying assembly having a plurality of movable lens components movable during zooming and stationary during focusing, and an image forming assembly stationary during zooming, said image forming assembly including a lens component B having negative refractive power and movable at a time of focusing, a lens component A on the object side of said lens component B and movable when focusing, and a lens component C on the image side of said lens group B and movable when focusing.

2. A zoom lens according to claim 1, wherein said lens component A and said lens component C each have a positive power.

3. A zoom lens according to claim 1, wherein said lens component A and said lens component C move as a unit.

4. A zoom lens according to claim 1, wherein said lens component A and said lens component C move in different relation to each other.

5. A zoom lens according to claim 1, wherein the lens component A has a negative power and the lens component C has a positive power.

6. A zoom lens according to claim 1, wherein each lens component moves such that the separation between the lens component A and the lens component B increases and the separation between the lens component B and the lens component C decreases when focusing to a short distance.

7. A zoom lens of the rear focusing type comprising:
a lens component B movable when focusing and having a negative power;
a lens component A arranged on the object side of said lens component B at a point adjacent to said lens component B and movable when focusing;
a lens component C arranged on the image side of said lens component B at a point adjacent to said lens component B and movable when focusing, said lens component B, said lens component A and said lens component C being stationary during zooming; and
a magnification varying lens group arranged on the object side of said lens component A and movable when zooming and stationary when focusing.

8. A zoom lens according to claim 7, wherein said lens component A and said lens component C have positive refractive powers.

9. A zoom lens according to claim 7, wherein the lens component A has a negative power and the lens component C has a positive power.

10. A zoom lens according to claim 7, wherein each lens component moves such that the separation between the lens component B and the lens component A increases and the separation between the lens component B and the lens component C decreases when focusing to a short distance.

11. A zoom lens of the rear focusing type comprising:
a lens component B stationary during focusing and having a negative power;
a lens component A arranged on the object side of said lens component B at a point adjacent to said lens component B and movable when focusing;
a lens component C arranged on the image side of said lens component B at a point adjacent to said lens component B and movable when focusing, said lens component B, said lens component A and said lens component C being stationary during zooming; and
a magnification varying fourth lens group arranged on the object side of said lens component A and movable when zooming.

12. A zoom lens according to claim 11, wherein said lens component A and said lens component C have positive refractive power.

13. A zoom lens according to claim 11, wherein the lens component A has a negative power and the lens component C has a positive power.

14. A zoom lens according to claim 11, wherein each lens component moves in such a manner that the separation between the lens component B and the lens component A increases and the separation between the lens component B and the lens component C decreases when focusing to a short distance.

15. A zoom lens of the rear focusing type comprising: from front to rear, a magnification varying assembly having a plurality of movable lens components movable during zooming and stationary during focusing, and an image forming assembly stationary during zooming, said image forming assembly including a lens component B having negative refractive power and stationary at a time of focusing, a lens component A on the object side of said lens component B and movable when focusing, and a lens component C on the image side of said lens group B and movable when focusing.

16. A zoom lens according to claim 15, wherein said lens component A and said lens component C each have a positive power.

17. A zoom lens according to claim 15, wherein said lens component A and said lens component C move as a unit.

18. A zoom lens according to claim 15, wherein said lens component A and said lens component C move in different relation to each other.

19. A zoom lens according to claim 15, wherein the lens component A has a negative power and the lens component C has a positive power.

20. A zoom lens according to claim 15, wherein each lens component moves such that the separation between the lens component A and the lens component B increases and the separation between the lens component B and the lens component C decreases when focusing to a short distance.

* * * * *